(12) United States Patent
Bezbaruah et al.

(10) Patent No.: US 10,642,518 B1
(45) Date of Patent: May 5, 2020

(54) SYSTEM AND METHOD FOR CREATING HIGH FREQUENCY SNAPSHOTS OF AN ENTITY IN A VIRTUALIZED ENVIRONMENT

(71) Applicant: Nutanix, Inc., San Jose, CA (US)

(72) Inventors: Angshuman Bezbaruah, Redmond, WA (US); Bharath Kumar Beedu, Bangalore (IN); Kiran Tatiparthi, Dublin, CA (US); Mayur Sadavarte, Sunnyvale, CA (US); Pranab Patnaik, Cary, NC (US); Praveen Padia, Fremont, CA (US)

(73) Assignee: NUTANIX, INC., San Jose, CA (US)

( * ) Notice: Subject to any disclaimer, the term of this patent is extended or adjusted under 35 U.S.C. 154(b) by 42 days.

(21) Appl. No.: 16/171,287

(22) Filed: Oct. 25, 2018

(51) Int. Cl.
*G06F 12/00* (2006.01)
*G06F 3/06* (2006.01)
*G06F 12/0804* (2016.01)

(52) U.S. Cl.
CPC ............ *G06F 3/0632* (2013.01); *G06F 3/065* (2013.01); *G06F 3/067* (2013.01); *G06F 3/0619* (2013.01); *G06F 3/0664* (2013.01); *G06F 12/0804* (2013.01); *G06F 2212/1008* (2013.01); *G06F 2212/152* (2013.01); *G06F 2212/154* (2013.01)

(58) Field of Classification Search
CPC .... G06F 3/0632; G06F 3/0664; G06F 3/0619; G06F 3/067; G06F 12/0804; G06F 3/065; G06F 2212/1008; G06F 2212/152; G06F 2212/154

USPC .......... 711/113, 114, 115, 162, 170
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,639,546 B1* | 5/2017 | Gorski | G06F 12/0808 |
| 9,772,866 B1 | 9/2017 | Aron et al. | |
| 9,880,933 B1* | 1/2018 | Gupta | G06F 12/0815 |
| 9,946,605 B2 | 4/2018 | Zhang et al. | |
| 2011/0184912 A1* | 7/2011 | Baptist | G06F 11/1448 707/639 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Mardochee Chery
(74) *Attorney, Agent, or Firm* — Foley & Lardner LLP (57) ABSTRACT

A system and method for capturing high frequency snapshots of an entity includes creating, by a storage sub-system associated with a distributed storage system of a virtualized environment, a cached configuration of an entity within the storage sub-system, capturing, by the storage sub-system, a snapshot of the entity from the cached configuration based on a schedule of a snapshot policy, including sending, by the storage sub-system, the snapshot to a repository indicated in the snapshot policy, and determining, by the storage sub-system, that a configuration file associated with the entity has been updated. The system and method also includes updating, by the storage sub-system, the cached configuration based upon the configuration file that has been updated.

23 Claims, 5 Drawing Sheets

(56) References Cited

U.S. PATENT DOCUMENTS

2013/0174151 A1* 7/2013 Nakajima ............... G06F 9/461
                                                                                                    718/1

OTHER PUBLICATIONS

Github Contributors. "Snapback: Configuration Snapshot and Rollback" (accessed Sep. 17, 2019) from https://acitoolkit.readthedocs.io/en/latest/snapback.html, Cisco Systems, Inc. Revision b4b65e80.

Oracle. "Administrator's Guide: Backing Up the Store" (accessed Sep. 17, 2019) from https://docs.oracle.com/en/database/other-databases/nosql-database/18.3/ad min/backing-store.html#GUID-31470932-7DEE-4D2A-ACCB-B33C352E7C10.

Oracle. "Oracle Fusion Middleware Administration Guide for Oracle Unified Directory 11g Release 1 (11.1.1): Backing Up and Restoring Data" (accessed Sep. 17, 2019) from https://docs.oracle.com/cd/E22289_01/html/821-1273/backing-up-and-restoring-data.html (published 2011).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR CREATING HIGH FREQUENCY SNAPSHOTS OF AN ENTITY IN A VIRTUALIZED ENVIRONMENT

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present day virtual computing systems have limitations due to their configuration and the way they operate.

SUMMARY

In accordance with some aspects of the present disclosure, a method is disclosed. The method includes creating, by a storage sub-system associated with a distributed storage system of a virtualized environment, a cached configuration of an entity within the storage sub-system, capturing, by the storage sub-system, a snapshot of the entity from the cached configuration based on a schedule of a snapshot policy, including sending, by the storage sub-system, the snapshot to a repository indicated in the snapshot policy, and determining, by the storage sub-system, that a configuration file associated with the entity has been updated. The method also includes updating, by the storage sub-system, the cached configuration based upon the configuration file that has been updated.

In accordance with some other aspects of the present disclosure, a system is disclosed. The system includes a host machine in a virtualized environment, the host machine having a plurality of entities thereon. The system also includes a distributed storage system associated with the host machine, the distributed storage system including a storage sub-system, the storage sub-system configured to capture high-frequency snapshots of the plurality of entities. The storage sub-system includes a memory for storing a cached configuration of the plurality of entities and a processing unit. The processing unit is configured to create the cached configuration of each of the plurality of entities within the memory, capture a snapshot of each of the plurality of entities from the cached configuration based on a schedule of a snapshot policy, and send the snapshot to a repository indicated in the snapshot policy. The processing unit is also configured to determine that a configuration file associated with at least one of the plurality of entities has been updated and update the cached configuration of the at least one of the plurality of entities based upon the configuration file that has been updated.

In accordance with yet other aspects of the present disclosure, a non-transitory computer readable media with computer-executable instructions embodied thereon is disclosed. The instructions when executed by a processor of a storage sub-system associated with a virtualized environment cause the storage sub-system to perform a process. The process includes creating a cached configuration of an entity within the storage sub-system, capturing a snapshot of the entity from the cached configuration based on a schedule of a snapshot policy, including sending, by the storage sub-system, the snapshot to a repository indicated in the snapshot policy, and determining that a configuration file associated with the entity has been updated. The process also includes updating the cached configuration based upon the configuration file that has been updated.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure is generally directed to a virtualized environment (e.g., a virtual computing system) having a plurality of clusters, with each of the plurality of clusters having a plurality of nodes. Each of the plurality of nodes includes one or more virtual machines and other entities managed by an instance of a monitor such as a hypervisor. These and other components may be part of a datacenter, which may be managed by a user (e.g., an administrator or other authorized personnel). A distributed storage system, for providing storage and back-up capabilities, is associated with the virtualized environment. Virtualized environments may be configured to protect the entities therein by creating back-ups of those entities and storing those back-ups at a remote site. By creating the back-ups of the entities, a continuity of operation of the entities may be maintained in the aftermath of a disaster condition. Thus, if a particular entity or the underlying node becomes non-operational for some reason, a replicated copy of the entities may be accessed from the remote site.

The disaster condition may include planned outages, performance related failures, component failures, power failures, natural calamities, or any other condition that hampers the normal operation of entities. Generally speaking and as used herein, a disaster condition is any condition that causes hardware failure, software failure, firmware failure, or any combination thereof that prevents the underlying entity from operating as intended. "Entity" as used herein means a virtual machine, a container, a software application, a volume group, or any other element or resource of the virtualized environment that is desired to be replicated/backed-up.

To create a back-up of an entity, the configuration of that entity needs to be known. The "configuration" of an entity includes the set of resources that are assigned to that entity and that allow the entity to operate as intended. For example, configuration may include the allocated processing capacity (e.g., central processing unit(s) ("CPU")), memory, network interfaces, user interfaces, etc. These allocated resources of the entity may be catalogued within a configuration file that may be stored within the distributed storage system or within a configuration database associated with the virtualized environment. The configuration may also include the storage disks/logical unit numbers ("LUNs") provisioned from the distributed storage system and that the entity is composed of, and the data associated with the storage disks/LUNs may be stored within a storage file. In some embodiments, one storage file may be provided for each storage disk/LUN. The storage file may also be stored within the distributed storage system. Thus, the configuration of an entity may be represented by the combination of the entity's configuration file(s) (or configuration database(s)) and storage file(s).

When the configuration of an entity changes (e.g., a new storage disk is added, an existing storage disk is removed, and/or other changes are made to the allocated resources), the configuration file (or the configuration database) of that entity is updated to reflect the changes in the configuration. For example, when the entity is a virtual machine, the configuration of the virtual machine includes one or more storage files (e.g., VMDK or VHD files, etc.) that identify the data associated with the set of virtual disks/LUNs that the virtual machine is composed of, as well as one or more configuration files (or configuration database(s)) (e.g., .VMX file, .CFG files, etc.) that include the resources such as CPU, memory, networking interfaces, etc. associated with the virtual machine. When the configuration of a virtual machine changes (e.g., a new virtual disk is added, an existing virtual disk is removed, or any of the other virtual machine resources are modified), the contents of the configuration file(s) (or the configuration database(s)) associated with that virtual machine are updated as well. The contents of the storage file(s), on the other hand, do not generally change when the change in configuration happens. Generally speaking, the contents of the storage file change when an application running in the guest operating system of the virtual machine writes (or possibly deletes) data from the set of virtual disks/LUNs associated with the virtual machine. However, due to the change in the configuration of the virtual machine, a new storage file may be added (e.g., if a new virtual disk/LUN is created) and/or an existing storage file may be removed (e.g., if the associated virtual disk/LUN is deleted).

The back-up of an entity may be created by capturing a snapshot of the entity, and particularly, by capturing a snapshot of the configuration of that entity. Specifically, snapshots may be captured by creating a snapshot of all of the storage files and a snapshot of all of the configuration files (or the configuration database entries associated with the configuration). Further, the configuration of an entity is known to the underlying monitor that is configured to create, run, and/or control the entity. To capture a snapshot of the entity, the configuration of that entity may be requested from the underlying monitor before each snapshot is captured. For example, the configuration of a virtual machine is known to the underlying hypervisor. Thus, to capture a snapshot of the virtual machine, the configuration of the virtual machine may be requested from the underlying hypervisor before capturing each snapshot. Therefore, each snapshot that is captured requires a management call or query to the underlying monitor (e.g., hypervisor) to get the entity configuration before the snapshot is captured. By requesting the entity configuration from the underlying monitor before capturing a snapshot, the snapshot that is captured reflects the most updated configuration of that entity by accounting for any updates to the configuration of the entity that may have occurred since the previous snapshot capture.

However, requesting the configuration of an entity from the underlying monitor (e.g., hypervisor) before each snapshot is inefficient and prevents capture of snapshots at intervals below a certain threshold. Specifically, each snapshot may only be captured at a certain frequency (e.g., time difference between two consecutively captured snapshots) based upon the time needed to request and receive the configuration of the entity from the underlying monitor, and the time needed to capture the snapshot from that configuration. This frequency is generally of the order of at least a minute, and likely a few minutes. In some cases, such a frequency of capturing snapshots may not be enough, and snapshots may be desired to be captured more frequently. To capture snapshots at a frequency that the current mechanisms are unable to accomplish, the present disclosure provides technical solutions. For example, the present disclosure provides improvements in computer related technology that allow capturing snapshots of entities at a high frequency. High frequency means capturing a snapshot at a granularity of less than sixty seconds, or in other words, capturing more than one snapshot within sixty seconds. Simply as an example and without intending to be limiting in any way, the present disclosure may be used to capture snapshots at a frequency of five-ten seconds.

The configuration file (or configuration database) of an entity changes infrequently. Generally speaking, the configuration file (or configuration database) changes only when the arrangement of resources that are allocated to the entity change. For example, when an additional disk is allocated to the entity, the configuration file or the configuration database entries may be updated to reflect the additional disk. As discussed below, a storage sub-system associated with the configuration file is configured to determine when changes to the configuration occur. When the configuration is stored as a configuration database, the storage sub-system associated with the configuration database may register for (e.g., request) change notifications on the database entries storing the configuration of the entity. By registering for change notifications, the storage sub-system may receive notifications of any changes to the entries of the configuration database when the configuration is updated.

Further, while the storage file of the entity changes more frequently (e.g., each time data is written to/deleted from the associated storage disks/LUNs), the contents of an existing storage file are unlikely to change as a result of the configuration update (e.g., addition of the new disk). However, a new storage file may be created for the new disk that is added to the entity. The present disclosure takes advantage of the infrequent changes to the configuration file (or configuration database) to capture the snapshots at a high frequency.

Specifically, the storage sub-system that is associated with the distributed storage system caches the location of the configuration file (or the configuration database) and the location of the storage file of the entity within a high-speed memory. The storage sub-system may receive the location of the configuration file (or the configuration database) and the location of the storage file from a monitor (e.g., hypervisor) associated with the entity. The storage sub-system may create the cached entries based on the information received from the monitor. By caching the location of the configuration file (or configuration database) and the location of the storage file, the storage sub-system is able to create snapshots at a high frequency by using the cached locations—without having to query the monitor (e.g., hypervisor) for the configuration each time a snapshot is captured. Thus, the time needed to make the management calls or queries to the monitor is saved and the snapshots may be captured at a much faster rate.

To ensure that any updates to the configuration file (or configuration database) of the entity are reflected in the snapshots, the storage sub-system monitors changes to the configuration file (or configuration database) of the entity. For example, in some embodiments, the storage sub-system may be configured to monitor a modification time of the configuration file (or configuration database) after each snapshot capture to ensure that any updates to the configuration file (or configuration database) are reflected in the next snapshot that is captured. Once a change to the configuration file (or configuration database) of an entity is detected, the storage sub-system may update the cached locations of the configuration file (or the configuration database) and/or the storage file based on the updated configuration file, and continue capturing snapshots using the cached locations. The storage sub-system may receive the updated location of the configuration file (or the configuration database) and the storage file from the monitor (e.g., hypervisor) associated with the entity.

Thus, the present disclosure provides an efficient and convenient mechanism to capture high frequency snapshots. The present disclosure improves the operation of the underlying node and the virtualized environment by providing a capability of taking high frequency snapshots. The present disclosure also allows a vendor to offer more lucrative Service Level Agreements ("SLAs") to their customers.

It is to be understood that the present disclosure is described mostly with respect to virtual machines. However, the present disclosure is also applicable to other types of entities defined herein that are desired to be snapshotted, including for example clusters, containers, databases, etc. Further, although the present disclosure has been described with respect to those entities whose configuration is stored within a configuration file, the present disclosure is also intended to apply to those entities whose configuration is stored in a configuration database.

Figure 1:
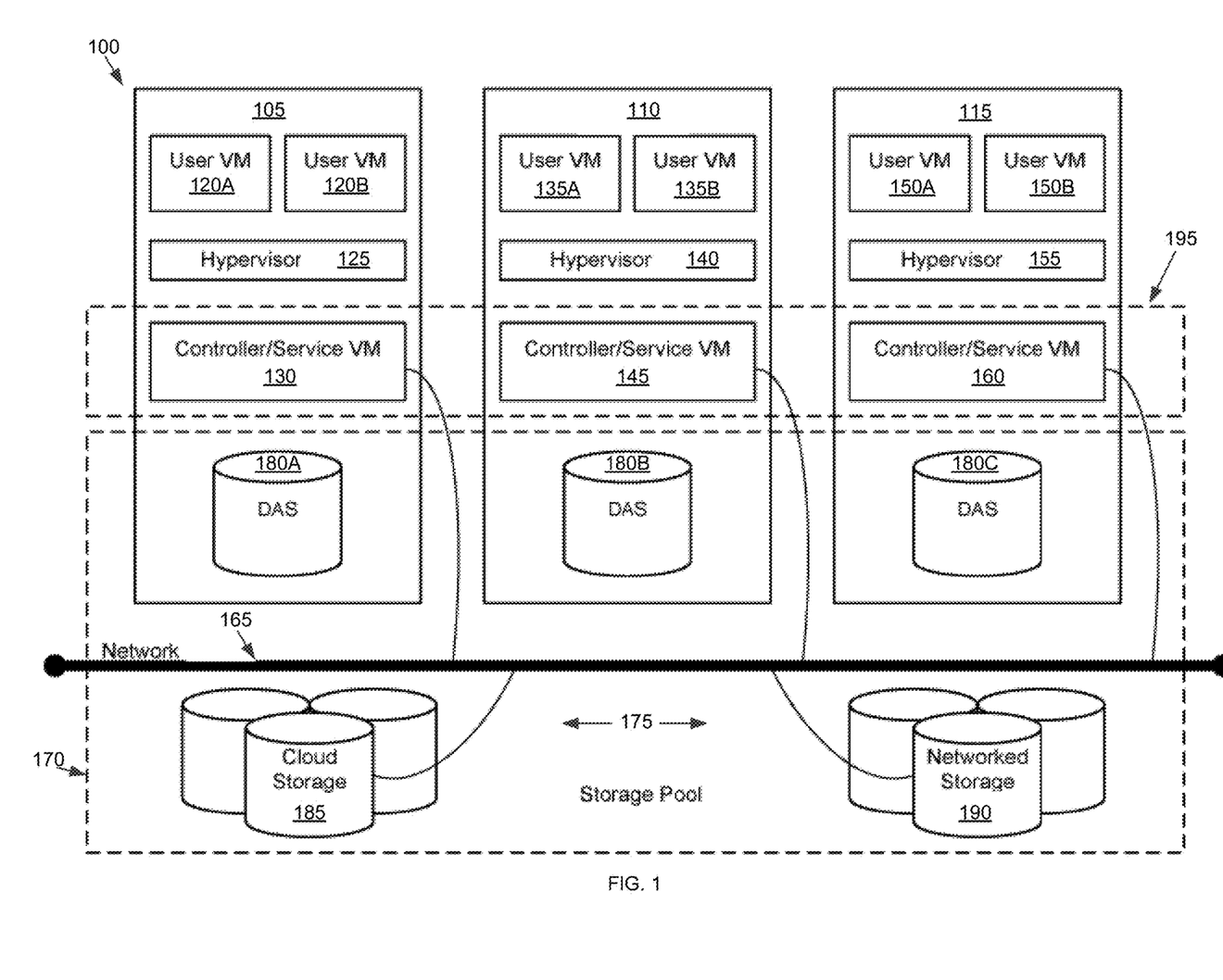
FIG. 1 is an example block diagram of a cluster of a virtualized environment, in accordance with some embodiments of the present disclosure.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the cluster 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165. Further, although not shown, one or more of the first node 105, the second node 110, and the third node 115 may include one or more containers managed by a monitor (e.g., container engine).

The cluster 100 also includes and/or is associated with a storage pool 170 (also referred to herein as storage sub-system). The storage pool 170 may include network-attached storage 175 and direct-attached storage 180A, 180B, and 180C. The network-attached storage 175 is accessible via the network 165 and, in some embodiments, may include cloud storage 185, as well as a networked storage 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be provided within the cluster. Likewise, although only two user VMs (e.g., the user VMs 120, the user VMs 135, and the user VMs 150) are shown on each of the first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center. Further, one or more of the first node 105, the second node 110, and the third node 115 may be organized in a variety of network topologies. Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the networked storage 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended.

The user VMs 120, the user VMs 135, the user VMs 150, and any newly created instances of the user VMs are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
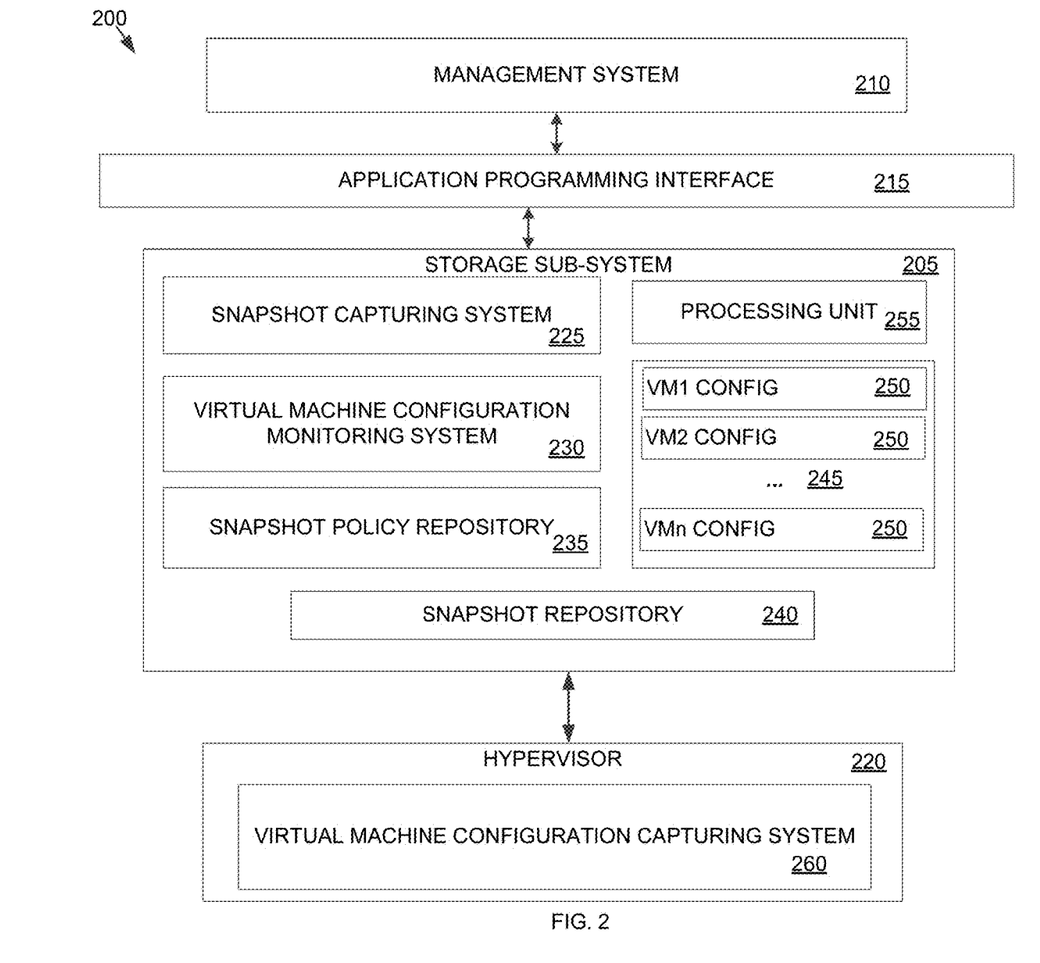
FIG. 2 is an example block diagram of a snapshotting system of the virtualized environment, in accordance with some embodiments of the present disclosure.

Turning now to FIG. 2, an example block diagram of a snapshotting system 200 is shown, in accordance with some embodiments of the present disclosure. The snapshotting system 200 or portions thereof may be configured as utility software for creating and implementing a snapshot policy. The snapshotting system 200 includes a storage sub-system 205 that is configured to receive data from a user to create the snapshot policy and capture snapshots of one or more virtual machines based on the snapshot policy. The storage sub-system 205 is communicably connected to a management system 210 via an application programming interface ("API") 215. The storage sub-system 205 is also connected to a hypervisor 220 to receive a configuration (e.g., location of configuration file(s) plus location of storage file(s)) of one or more virtual machines for implementing the snapshot policy.

The storage sub-system 205 may be part of or at least communicably associated with the storage pool 170 of FIG. 1. The storage sub-system 205 is configured to capture snapshots of virtual machines based on the snapshot policy. Thus, the storage sub-system 205 includes a snapshot capturing system 225 for taking snapshots of one or more virtual machines associated with the hypervisor 220, a virtual machine configuration monitoring system 230 for monitoring configuration changes to the one or more virtual machines, a snapshot policy repository 235 for storing snapshot policies, a snapshot repository 240 for storing captured snapshots, and a memory 245 for caching the configuration of one or more virtual machines.

The snapshot capturing system 225 receives data from the user, parses the data to create a snapshot policy for the one or more virtual machines, stores the snapshot policy within the snapshot policy repository 235, captures snapshots of the one or more virtual machines using the configurations stored within the memory 245 in accordance with the snapshot policy, and stores the captured snapshots within the snapshot repository 240. The snapshot capturing system 225 may also send the captured snapshots to one or more remote sites (e.g., remote datacenters) identified in the snapshot policy. Thus, the snapshot capturing system 225 is configured to request, receive, create, and update the snapshot policy, as well as capture and store virtual machine snapshots. The virtual machine configuration monitoring system 230 monitors the configuration file of the one or more virtual machines to determine changes to the configuration of the one or more virtual machines. Upon detecting a change (e.g., update) in the configuration file of any of the one or more virtual machines, the virtual machine configuration monitoring system 230 updates a cached configuration 250 of that virtual machine within the memory 245. In some embodiments, the snapshot capturing system 225 may receive an updated configuration of the virtual machine whose configuration has been updated from the hypervisor 220 and update the cached configuration 250 based on the received updated configuration.

The memory 245 is configured to store (e.g., cache), for fast or high-speed access, the cached configuration 250 of the one or more virtual machines. In some embodiments, the memory 245 may be a cache memory or other high-speed non-volatile memory. Each instance of the cached configuration 250 includes a location (e.g., file path) of the configuration file(s) and a location (e.g., file path) of the storage file(s) of one virtual machine. By virtue of creating the cached configuration 250 of the configuration of the one or more virtual machines, the present disclosure provides the ability to capture high-frequency snapshots of the one or more virtual machines from the cached configuration, without having to make repeated management calls or queries to the hypervisor 220.

Although the snapshot capturing system 225 and the virtual machine configuration monitoring system 230 are shown as separate components, in some embodiments, these components may be integrated together, and the integrated component may perform the functions of the separate components, as disclosed herein. Likewise, although the snapshot policy repository 235 and the snapshot repository 240 are shown as separate memory components, those components may be integrated together. The snapshot policy repository 235 and the snapshot repository 240 may both be provisioned from the storage pool 170 and/or at least portions of those repositories may be separately provisioned from the storage pool. Similarly, the memory 245 may be provisioned from, or be separate from, the storage pool 170. Further, the snapshot capturing system 225, the virtual machine configuration monitoring system 230, and one or more other components of the storage sub-system 205 that are associated with taking snapshots of virtual machines in accordance with the snapshot policy may be configured as, and/or operate in association with, hardware, software, firmware, or a combination thereof. Specifically, the storage sub-system 205 may include a processing unit 255 configured to execute instructions for implementing the snapshot capturing system 225 and the virtual machine configuration monitoring system 230, and the other functionalities of the storage sub-system. In some embodiments, each of the snapshot capturing system 225 and the virtual machine configuration monitoring system 230 may have their own separate instance of the processing unit 255. The processing unit 255 may be implemented in hardware, firmware, software, or any combination thereof. "Executing an instruction" means that the processing unit 255 performs the operations called for by that instruction.

The processing unit 255 may retrieve a set of instructions from a memory for execution. For example, in some embodiments, the processing unit 255 may retrieve the instructions from a permanent memory device like a read only memory (ROM) device and copy the instructions in an executable form to a temporary memory device that is generally some form of random access memory (RAM). The ROM and RAM may both be part of the storage pool 170 and/or provisioned separately from the storage pool. The processing unit 255 may be a special purpose computer, and include logic circuits, hardware circuits, etc. to carry out those instructions. The processing unit 255 may include a single stand-alone processing unit, or a plurality of processing units that use the same or different processing technology. The instructions may be written using one or more programming language, scripting language, assembly language, etc.

Referring still to FIG. 2, as indicated above, the storage sub-system 205 may be managed and operated by the management system 210. The user (e.g., administrative personnel) may provide the data for creating the snapshot policy via the management system 210 as well. The storage sub-system 205 may form the back-end of the snapshotting system 200, while the management system 210 may form the front-end of the snapshotting system. The user may, via the management system 210, instruct the storage sub-system 205 to perform one or more operations. Example operations may include providing data to create new snapshot policies, requesting updates to existing snapshot policies, requesting to apply the snapshot policies definitions on demand, etc. Upon receiving instructions from the management system 210, the storage sub-system 205 may perform actions consistent with those instructions. Thus, the storage sub-system 205 is not visible to the user, but is rather configured to operate under control of the management system 210, which is visible to and operated by the user.

In some embodiments, the management system 210 may be installed on a device associated with the central management system and/or the local management system of a particular node (e.g., the first node 105, the second node 110, and the third node 115 of FIG. 1). In other embodiments, instead of or in addition to being installed on a particular device, the management system 210 may be hosted on a cloud service and may be accessed via the cloud. In some embodiments, the management system 210 may additionally or alternatively be configured as a mobile application that is suitable for installing on and access from a mobile computing device (e.g., a mobile phone). Thus, the management system 210 may be installed in a variety of ways.

Further, the management system 210 may be configured to access the storage sub-system 205 in a variety of ways. For example, in some embodiments, the management system 210 may be configured to access the storage sub-system 205 via the API 215. To access the storage sub-system 205 via the API 215, users may access the management system 210 via designated devices such as laptops, desktops, tablets, mobile devices, other handheld or portable devices, and/or other types of computing devices that are configured to access the API. These devices may be different from the device on which the storage sub-system 205 is installed.

In some embodiments and when the management system 210 is configured for use via the API 215, the users may access the storage sub-system 205 via a web browser and upon entering a uniform resource locator ("URL") for the API. Using the API 215, the users may then send instructions to the storage sub-system 205 and receive information back from the policy engine. In some embodiments, the API 215 may be a representational state transfer ("REST") type of API. In other embodiments, the API 215 may be any other type of web or other type of API (e.g., ASP.NET) built using any of a variety of technologies, such as Java, .Net, etc., that is capable of accessing the storage sub-system 205 and facilitating communication between the users and the policy engine.

In some embodiments, the API 215 may be configured to facilitate communication between the users via the management system 210 and the storage sub-system 205 via a hypertext transfer protocol ("HTTP") or hypertext transfer protocol secure ("HTTPS") type request. The API 215 may receive an HTTP/HTTPS request and send an HTTP/HTTPS response back. In other embodiments, the API 215 may be configured to facilitate communication between the management system 210 and the storage sub-system 205 using other or additional types of communication protocols. In other embodiments, the management system 210 may be configured to access the storage sub-system 205 in other ways.

Thus, the management system 210 provides a user interface that facilitates human-computer interaction between the users and the storage sub-system 205. The management system 210 is configured to receive user inputs from the users via a graphical user interface ("GUI") of the management system and transmit those user inputs to the storage sub-system 205. The management system 210 is also configured to receive outputs/information from the storage sub-system 205 and present those outputs/information to the users via the GUI of the management system. The GUI may present a variety of graphical icons, visual indicators, menus, visual widgets, and other indicia to facilitate user interaction. In other embodiments, the management system 210 may be configured as other types of user interfaces, including for example, text-based user interfaces and other man-machine interfaces. Thus, the management system 210 may be configured in a variety of ways.

Further, the management system 210 may be configured to receive user inputs in a variety of ways. For example, the management system 210 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the management system. The management system 210 may also be configured to present outputs/information to the users in a variety of ways. For example, the management system 210 may be configured to present information to external systems such as users, memory, printers, speakers, etc.

Therefore, although not shown, the management system 210 may be associated with a variety of hardware, software, firmware components, or combinations thereof. Generally speaking, the management system 210 may be associated with any type of hardware, software, and/or firmware component that enables the storage sub-system 205 to perform the functions described herein and further enables a user to manage and operate the policy engine.

The hypervisor 220 is similar to the hypervisor 125, the hypervisor 140, and the hypervisor 155 of FIG. 1. The hypervisor 220 resides on a node (e.g., the first node 105, the second node 110, or the third node 115) and is configured to create and run the one or more virtual machines on that node. Thus, the hypervisor 220 is familiar with the configuration of the underlying one or more virtual machines. In other words, the hypervisor 220 is aware of the composition (e.g., what resources are allocated) of the one or more virtual machines, as well as the locations of the configuration file(s) and storage file(s) of each of the one or more virtual machines that are managed by the hypervisor. A virtual machine configuration capturing system 260 is associated with the hypervisor 220 to facilitate capturing snapshots of the one or more virtual machines associated with the hypervisor 220. The virtual machine configuration capturing system 260 may reside within the hypervisor 220, within the controller/service virtual machine of the node on which the hypervisor is installed, or within another component of the node. In some embodiments, the virtual machine configuration capturing system 260 may be located on the central management system that manages all of the clusters within a virtualized environment, or on another component outside the node on which the hypervisor 220 is located. When the virtual machine configuration capturing system 260 is located on a component outside of the node on which the hypervisor 220 is installed, the virtual machine configuration capturing system may be associated with multiple hypervisors (e.g., with multiple hypervisors within a cluster) to gather configuration information from the virtual machines associated with those multiple hypervisors.

The virtual machine configuration capturing system 260 is configured as a virtualization aware control layer on top of the storage sub-system 205. The virtual machine configuration capturing system 260 is configured to receive a location of the configuration file(s) and location of the storage file(s) of each of the one or more virtual machines from the hypervisor 220. The virtual machine configuration capturing system 260 is also configured to flag the configuration file(s) of each of the one or more virtual machines, and provide the location of the configuration file(s), the location of the storage file(s), and the flag(s) to the storage sub-system 205 for capturing snapshots. In some embodiments, instead of or in addition to communicating with the hypervisor 220, the virtual machine configuration capturing system 260 may be configured to communicate with a virtualization management plane or another component to receive the location of the configuration file(s) and location of the storage file(s) of the one or more virtual machines. In some embodiments, the virtual machine configuration capturing system 260 may simply receive the composition of the one or more virtual machines from the hypervisor 220 (and/or from another source), and the virtual machine configuration capturing system may identify the locations of the configuration file and the storage file from the composition.

Figure 3:
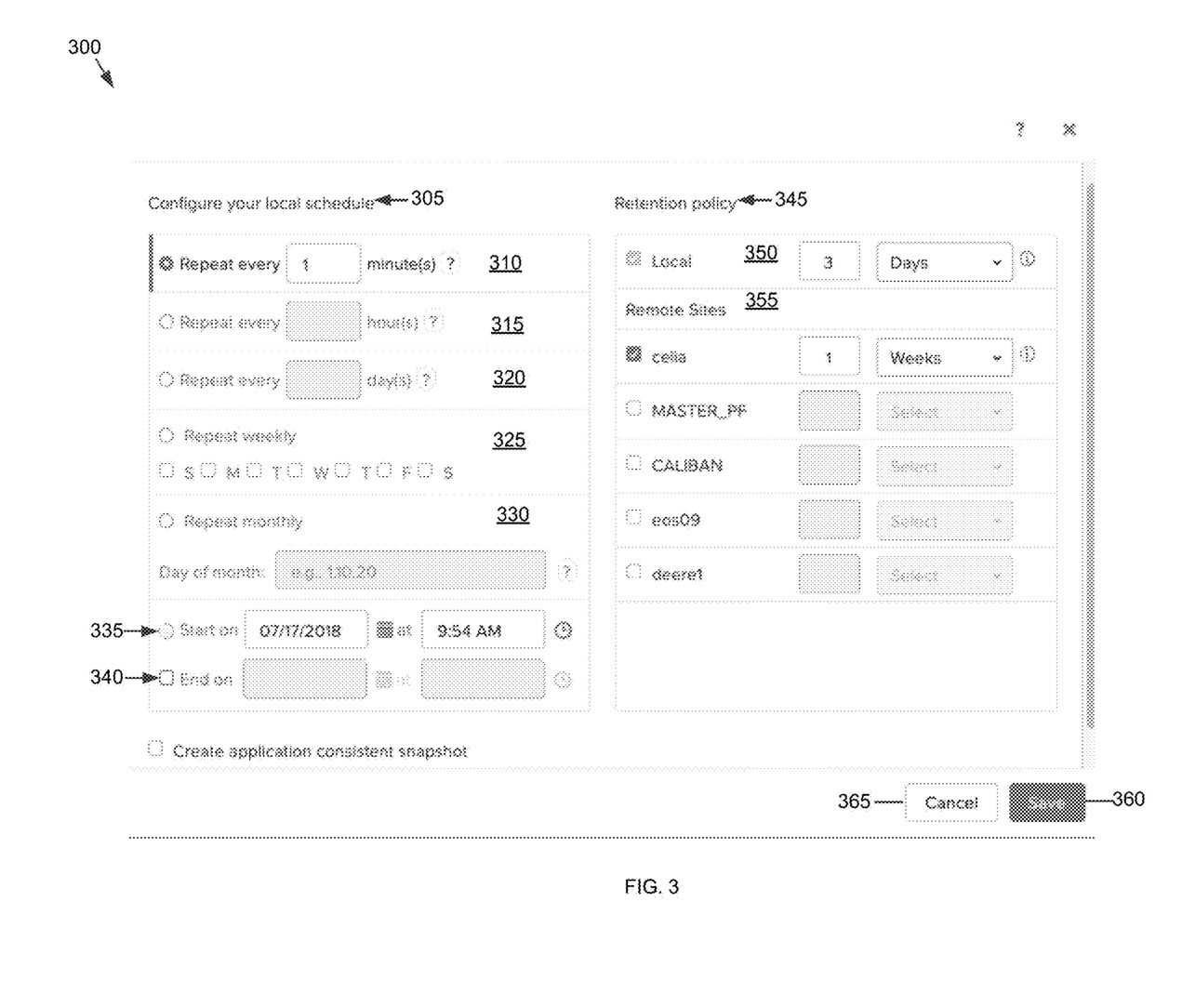
FIG. 3 is an example snapshot template for creating and implementing a snapshot policy, in accordance with some embodiments of the present disclosure.

Turning now to FIG. 3, an example of a snapshot template 300 for defining a snapshot policy is shown, in accordance with some embodiments of the present disclosure. The snapshot capturing system 225 may present the snapshot template 300 to the user to solicit data to create a new, or update an existing, instance of the snapshot policy. The snapshot template 300 includes a local schedule 305 for identifying the frequency with which to capture snapshots. The local schedule 305 may include units of time fields 310, 315, and 320 to identify how frequently to capture snapshots of a virtual machine. Although not shown, the local schedule 305 may also include a unit of time field for taking snapshots in seconds or in units of times other than minutes, hours, and days. The local schedule 305 may also include a repeat weekly field 325 to allow the user to specify specific days on which to capture snapshots and a repeat monthly field 330 to allow the user to specify a monthly schedule for capturing the snapshots of a virtual machine. Any other information that is considered useful or desirable in specifying a schedule for capturing snapshots of a virtual machine may be provided within the local schedule 305. The snapshot template 300 may also include a start date field 335 to allow the user to specify a date from which to start capturing snapshots and/or an end date field 340 to specify a date on which to stop capturing snapshots.

The snapshot template 300 also includes a retention policy 345 to define what to do with the snapshots once captured. For example, the retention policy 345 may define how long to store the snapshots. Thus, the snapshot template 300 may include a local retention field 350 to allow the user to define a time period (e.g., number of hours, days, weeks, months, or any other units of time) for which to store the snapshot locally (e.g., on the storage associated with the node on which the virtual machine from which the snapshot is captured is located). In some embodiments, the snapshot template 300 may additionally or alternatively include a field to define a number of snapshots to be captured, such that the number of snapshots stored at any instance is not greater than that number. The snapshot template 300 may also include a remote retention field 355 to allow the user to define a time period (e.g., number of hours, days, weeks, months, or any other units of time) for which to store the snapshot at a remote site. The remote retention field 355 may include a list of remote sites from which the user may select one or more of the remote sites to store the snapshots remotely. The snapshot template 300 may, in some embodiments, allow the user to add a remote site that is not already on the list.

It is to be understood that the snapshot template 300 is only an example and may vary from one embodiment to another. For example, although not shown, the snapshot template 300 may include a name field to allow the user to assign the snapshot policy a name. The snapshot template 300 may also include a field to identify the virtual machine(s) or other entities whose snapshots are been captured. In some embodiments, one instance of the snapshot template 300 may be used for one virtual machine. In other embodiments, multiple virtual machines and/or other entities may be covered by one instance of the snapshot template 300. Further, in some embodiments, some fields in the snapshot template 300 may be pre-filled or associated with certain default values that the user may (or may not) be allowed to change. If the user does not change the default values (if allowed to change), the snapshot policy is defined based on the default values. Some fields in the snapshot template 300 may be designated as mandatory for the user to fill, while other fields may be designated as optional. The snapshot template 300 may also include fields to specify specific clusters on the local site and the remote site to store the snapshots. The snapshot template 300 may also identify how many copies of the snapshot to capture in every instance, and how many copies to store locally and remotely. The snapshot template 300 may include additional or other fields than those discussed above, as needed or desired. Thus, the snapshot template 300 may be defined to include a variety of fields. Further, it is to be understood that the snapshot template 300 is only an example and one or more features shown and described herein may vary. For example, the order of the various fields, the format of the various fields, the size and shape of the font and other design features, etc. may vary from one embodiment to another.

Upon providing all of the information solicited in the snapshot template 300, the user may click on a save button 360 to save and send the snapshot template to the storage sub-system 205 for creating a snapshot policy or click on cancel button 365 to start again.

Figure 4:
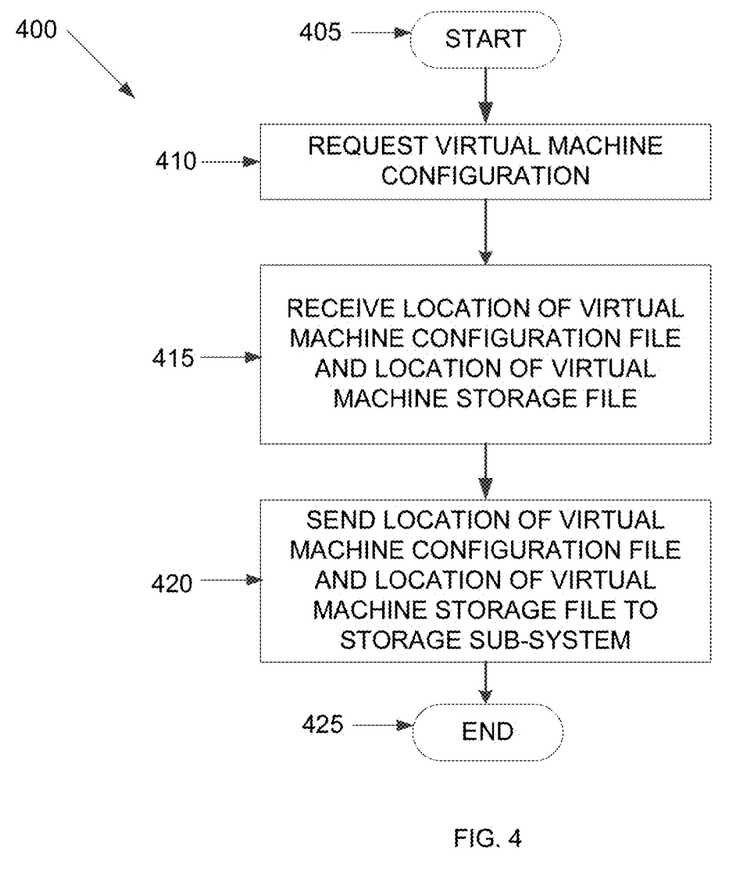
FIG. 4 is an example flowchart outlining operations for capturing a configuration of a virtual machine by the snapshotting system of FIG. 2, in accordance with some embodiments of the present disclosure.

Turning now to FIG. 4, an example flow chart outlining operations of a process 400 is shown, in accordance with some embodiments of the present disclosure. The process 400 may include additional, fewer, or different operations, depending on the particular embodiment. The process 400 is discussed in conjunction with FIGS. 2 and 3, and is implemented by the virtual machine configuration capturing system 260. Upon starting at operation 405, the virtual machine configuration capturing system 260 requests configuration of one or more virtual machines at operation 410. In some embodiments, the snapshot capturing system 225 (or another component having access to the snapshot policy) may provide the snapshot policy to the virtual machine configuration capturing system 260 from which the virtual machine configuration capturing system may identify the identity of the one or more virtual machines whose configuration is to be requested. In other embodiments, the snapshot capturing system 225 (or another component) may provide the identity of the one or more virtual machines to the virtual machine configuration capturing system 260 whose configuration is to be requested.

More specifically, when the virtual machine configuration capturing system 260 is associated with a particular node, the virtual machine configuration capturing system is configured to request the configuration of the one or more virtual machines that reside on that particular node. Thus, the virtual machine configuration capturing system 260 may receive the identity of one or more virtual machines and/or the snapshot policy to identify the identity of the one or more virtual machines residing on the same node as the virtual machine configuration capturing system to request the virtual machine configuration. When the virtual machine configuration capturing system 260 is associated with multiple nodes, the virtual machine configuration capturing system 260 may be configured to request the virtual machine configuration of the virtual machines on the associated nodes.

Additionally, the virtual machine configuration capturing system 260 may be configured to request the virtual machine configuration based upon satisfaction of one or more conditions. For example, when snapshots of a particular virtual machine are desired (e.g., when a disaster recovery policy is to be defined for the particular virtual machine), in some embodiments, the virtual machine configuration capturing system 260 may receive a request from the snapshot capturing system 225 to request the configuration of that particular virtual machine. Along with the request, the snapshot capturing system 225 may include the snapshot policy and/or the identity of the virtual machine whose configuration is to be requested. In other embodiments, the virtual machine configuration capturing system 260 may receive a request directly from the management system 210 for requesting the configuration of one or more virtual machines. The management system 210 may also include the snapshot policy and/or the identity of the virtual machines. Alternatively, the snapshot capturing system 225 may provide the snapshot policy and/or the identity of the virtual machines upon receiving a request from the management system 210 or the virtual machine configuration capturing system 260. By receiving the snapshot policy and/or the identity of the virtual machines whose configuration is to be requested, the virtual machine configuration capturing system 260 may be configured to request the configuration of only those virtual machines that are of interest.

To request the configuration of a virtual machine, the virtual machine configuration capturing system 260 may make a management call or query the hypervisor (e.g., the hypervisor 220) associated with that virtual machine. Since the hypervisor is configured to create, run, and otherwise control the virtual machines associated therewith, the hypervisor is familiar with the configuration of the virtual machines, as discussed above. Thus, the hypervisor is familiar with the composition of the virtual machines that are associated with the hypervisor, as well as aware of the location of the configuration file(s) and storage file(s) of each of those virtual machines. If the resources that are allocated to a particular virtual machine change, the associated hypervisor is configured to update the content of the configuration file(s). The associated hypervisor may also add new storage file(s) or delete existing storage file(s) associated with the virtual machine based on the changes in the resource allocation. In some embodiments, in addition to or instead of requesting the hypervisor, the virtual machine configuration capturing system 260 may request the configuration of a particular virtual machine from another source that is aware of that virtual machine's configuration (e.g., the location of the configuration file and location of the storage file).

It is to be understood that the configuration file may include a single configuration file or multiple configuration files. Similarly, the storage file may include a single storage file or multiple storage files (e.g., one storage file per virtual disk/LUN).

At operation 415, the virtual machine configuration capturing system 260 receives the requested configuration of the virtual machine. Specifically, the virtual machine configuration capturing system 260 receives a location of the configuration file(s) and a location of the storage file(s) of the virtual machine whose configuration is requested at the operation 410. Thus, when the virtual machine configuration capturing system 260 requests the configuration of a particular virtual machine at the operation 410, the hypervisor (or another component) returns a location of each of the configuration file(s) and location of each of the storage file(s).

Upon receiving the location of the configuration file(s) and the storage file(s) of the virtual machine, the virtual machine configuration capturing system 260 may flag the location of each of the configuration file(s). The flag(s) may be configured in a variety of ways. In some embodiments, the flag(s) may be single or multi-bit. The flag(s) may take other formats as well so long as the flag(s) identify the location of each of the configuration file(s). In some embodiments, the configuration of the virtual machine, and particularly, the configuration file(s) of the virtual machine, may be configured as an entry within the configuration database instead of a stand-alone file. In such cases, the virtual machine configuration capturing system 260 may receive the location of the entry within the configuration database where the configuration of the virtual machine resides, and the virtual machine configuration capturing system 260 may flag the database entry of the configuration database.

At operation 420, the virtual machine configuration capturing system 260 transfers the location of the configuration file(s) (or the location of the database entry), including the flag(s), as well as the location of the storage file(s) to the storage sub-system 205. The process 400 ends at operation 425.

Figure 5:
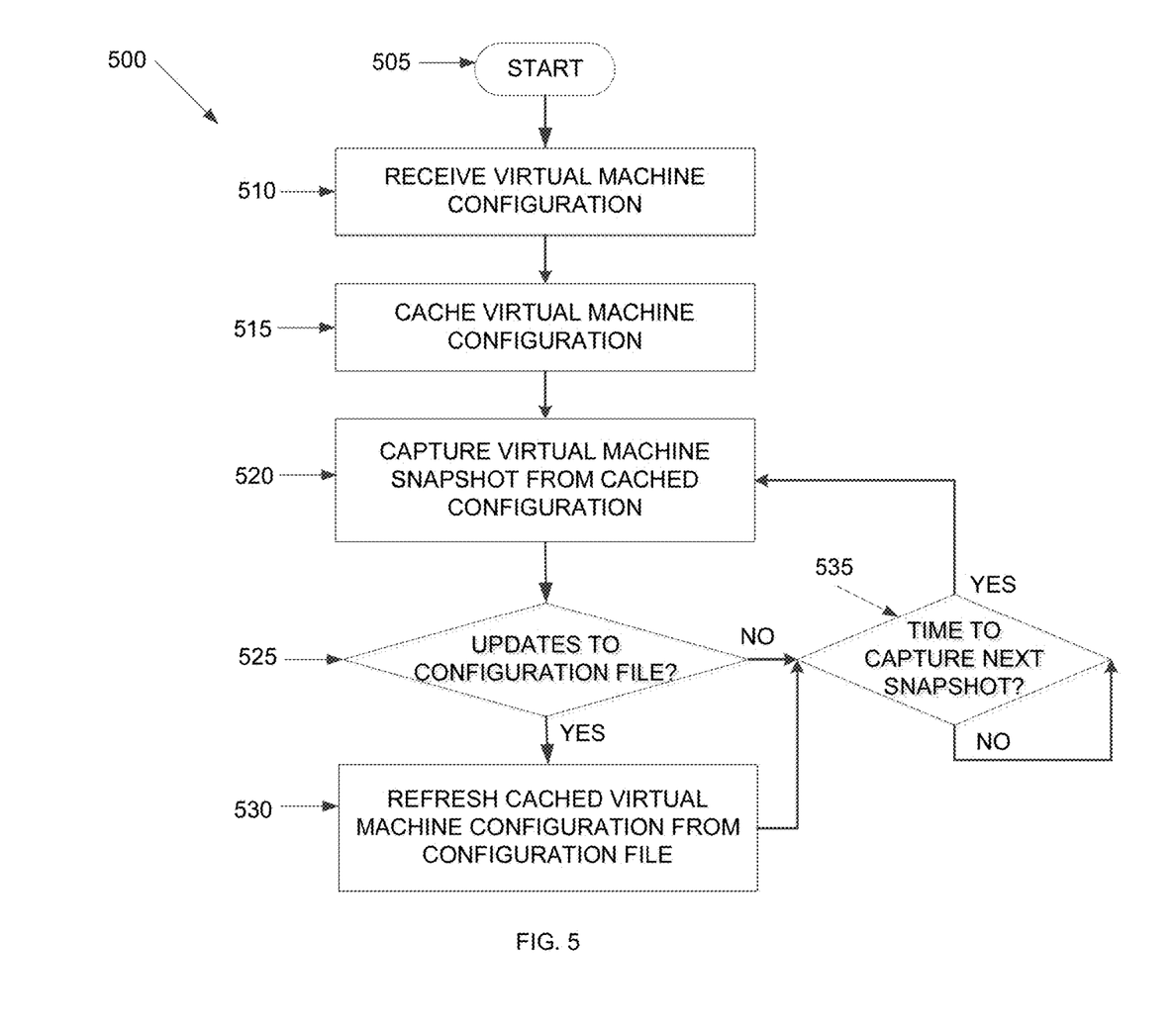
FIG. 5 is an example flowchart outlining operations for capturing snapshots of the virtual machine in accordance with the snapshot policy of FIG. 3, in accordance with some embodiments of the present disclosure.

Turning now to FIG. 5, an example flowchart outlining a process 500 is shown, in accordance with some embodiments of the present disclosure. The process 500 may include additional, fewer, or different operations, depending on the particular embodiment. The process 500 is discussed in conjunction with FIGS. 2-4, and is implemented by the storage sub-system 205. The process 500 starts at operation 505 with the snapshot capturing system 225 creating the snapshot policy. To create the snapshot policy, the snapshot capturing system 225 may send a blank (e.g., unfilled) instance of the snapshot template 300 to the user upon receiving a request from the user via the management system 210, upon receiving indication of creation of a new virtual machine, and/or based upon satisfaction of other conditions programmed within the snapshot capturing system.

Upon receiving the snapshot template 300, the user may fill in the requested data (e.g., the fill in the fields shown in FIG. 3), and transmit the completed snapshot template back to the snapshot capturing system 225. The snapshot capturing system 225 receives the completed version of the snapshot template 300 and may store the completed snapshot template within the snapshot policy repository 235. In some embodiments, the snapshot capturing system 225 may be configured to periodically update an existing snapshot policy based upon conditions programmed therein. The snapshot capturing system 225 may also receive a snapshot policy updating request from the user via the management system 210 to update an existing snapshot policy. Upon receiving the user request to update an existing instance of the snapshot policy or to periodically update the snapshot policy on its own accord, the snapshot capturing system 225 may retrieve the existing filled copy of the snapshot template 300 corresponding to the snapshot policy that is to be updated, from the snapshot policy repository 235. The snapshot capturing system 225 may send the retrieved copy to the user for updating. Upon receiving the updated copy of the snapshot template 300 from the user, the snapshot capturing system 225 may save the updated snapshot template within the snapshot policy repository 235.

The data filled in by the user within the snapshot template 300 (whether in a new snapshot template or in an existing snapshot template) constitutes the snapshot policy to be implemented by the various components of the storage sub-system 205. To create the snapshot policy from the snapshot template 300, the snapshot capturing system 225 extracts the data filled in by the user in the snapshot template. Thus, the snapshot capturing system 225 parses the snapshot template 300 by identifying (e.g., via character matching, etc.) various syntactic components from the snapshot template and compiling the identified syntactic components in a form readily understood by the storage sub-system 205 and by the virtual machine configuration capturing system 260. Among other things, by parsing the snapshot template 300, the snapshot capturing system 225 identifies the virtual machine(s) whose snapshots are to be captured, the frequency with which to capture snapshots, location to store the snapshots, time period for which to retain the snapshots, and any other information that may be considered useful or desirable to have in implementing the snapshot policy. The aggregate of information extracted and compiled from the snapshot template 300 forms the snapshot policy. The snapshot capturing system 225 also stores the snapshot policy within the snapshot policy repository 235. As indicated above, the snapshot capturing system 225 may also provide the snapshot policy and/or the identity of the virtual machines whose snapshots are to be captured to the virtual machine configuration capturing system 260. The virtual machine configuration capturing system 260 captures the configuration of each of the identified virtual machines as discussed with respect to FIG. 4 above.

Thus, the storage sub-system 205 receives the location of the configuration file(s), including the flag(s), as well as the location of the storage file(s) from the virtual machine capturing system 260 at operation 510. At operation 515, the snapshot capturing system 225 creates a cache entry for each virtual machine whose configuration is received at the operation 510. To create a cache entry (e.g., an instance of the cached configuration 250) for a particular virtual machine, the snapshot capturing system 225 may store the location of the configuration file(s), including the flag(s), and the location of the storage file(s) within the memory 245. By virtue of storing the location of the configuration file(s) and the location of the storage file(s) of the virtual machine within the memory 245, the snapshot capturing system 225 does not have to wait for the virtual machine configuration capturing system 260 to send the configuration file(s) of the virtual machine each time the snapshot capturing system captures a snapshot, thereby saving time that would otherwise be consumed by requesting the configuration and allowing high frequency snapshots to be captured of the virtual machine. Thus, while with the conventional mechanisms, snapshots could be captured in the order of a few minutes, by caching the virtual machine configuration, the present disclosure allows capturing snapshots every few seconds (e.g., 5-10 seconds).

A "snapshot" as used herein means a point in time image of the virtual machine. Thus, the snapshot includes a complete encapsulation of the virtual machine, including the configuration data of the entity, the user data, and any metadata associated with the entity: all of which is reflected in the configuration file(s) and the storage file(s) of the virtual machine and that are stored at the locations cached within the memory 245. Any of a variety of snapshotting techniques may be used. For example, in some embodiments, copy-on-write, redirect-on-write, or other snapshotting methods may be used to capture snapshots. In other embodiments, a near-sync method may be used to create rapid snapshots. At operation 520, the snapshot capturing system 225 captures a snapshot of the virtual machine based on the frequency (e.g., the local schedule 305) contained in the snapshot policy associated with that virtual machine. To capture a snapshot of the virtual machine, the snapshot capturing system 225 retrieves the location of the configuration file(s) of the virtual machine from the memory 245, accesses the location of the configuration file(s), and captures a snapshot of the configuration file. Additionally, the snapshot capturing system 225 retrieves the location of the storage file(s) of the virtual machine from the memory 245, accesses the location of the storage file(s), and captures a snapshot of the storage file(s). Thus, the combination of the snapshot of the configuration file(s) and the snapshot of the storage file(s) constitutes a snapshot of the virtual machine at a given time instance. Upon capturing the snapshot, the snapshot capturing system 225 stores the snapshot within the snapshot repository 240. Additionally, the snapshot capturing system 225 may transfer the snapshot to a remote location as identified in the snapshot policy (e.g., via the remote retention field 355 of the snapshot policy template).

Further, since the snapshot capturing system 225 creates snapshots using the cached locations of the configuration file(s) and the storage file(s) stored within the memory 245, and since the snapshot capturing system is a virtualization agnostic layer, any updates to the configuration of the virtual machine may not be reflected within the snapshots that are captured using the cached locations. Thus, at operation 525, the virtual machine configuration monitoring system 230 monitors for any updates to the configuration file(s) of the virtual machine that is stored within the storage pool 170. Updates to the configuration of the virtual machine may be attributed to either change in location of the configuration file(s) and/or the storage file(s), and/or change in the resource allocation of the virtual machine. If the location of the configuration file(s) or the storage file(s) changes, then the cached location of the configuration file(s) or the storage file(s) within the memory 245 becomes invalid. In such a case, the snapshot capturing system 225 is unable to find the configuration file(s) or the storage file(s) whose location has changed at the operation 520. Upon not finding the configuration file(s) or the storage file(s) at the cached location, the snapshot capturing system 225 may temporarily halt the snapshot capturing schedule and request an updated configuration (e.g., an updated location of the configuration file(s) and the storage file(s)) from the virtual machine configuration capturing system 260.

On the other hand, if the configuration update is due to change in the allocation of the resources, the content of the configuration file(s) changes to reflect the updated resource allocation. Thus, as discussed above, the contents of the configuration file(s) of a particular virtual machine changes only when the arrangement of the resources allocated to that virtual machine are changed. In contrast, the contents of the storage file(s) of the particular virtual machine do not change when the resources that are allocated to the virtual machine are updated. Since the snapshot capturing system 225 accesses the storage file(s) and the configuration file(s) using the cached locations within the memory 245, any updates to the contents of the configuration file(s) or the storage file(s) are reflected in the captured snapshots. However, if the configuration file(s) has changed, the snapshot capturing system 225 may have an incomplete picture of the configuration of the virtual machine. For example, if a new virtual disk is added to the virtual machine, the configuration file(s) changes to reflect the addition of the new virtual machine. The new virtual disk may be associated with a new storage file in some embodiments. The snapshot capturing system 225 does not have access to the new storage file. Thus, the cached location of the configuration file(s) and the cached location of the storage file(s) does not include a location of the new storage file for the newly added virtual disk. Therefore, by monitoring the configuration file(s), the virtual machine configuration monitoring system 230 determines whether the resource allocation of a virtual machine has changed.

In some embodiments, the virtual machine configuration monitoring system 230 may monitor a modification time identifying when the configuration file(s) was last modified. If the modification time is more recent than when the cached configuration 250 of the virtual machine in the memory 245 was created, the virtual machine configuration monitoring system 230 determines that the configuration of the virtual machine has been updated. In other embodiments, the virtual machine configuration monitoring system 230 may be configured to use other or additional mechanisms to identify updates to the configuration file. Further, the virtual machine configuration monitoring system 230 may identify the files to monitor by virtue of the flag(s). As indicated above, the virtual machine configuration capturing system 260 flags the locations of each of the configuration file(s). Thus, if the flag for a particular location is enabled, the virtual machine configuration monitoring system 230 may associate the corresponding location to a configuration file that is to be monitored. Thus, the virtual machine configuration monitoring system 230 is configured to monitor those files whose cached location in the memory 245 is associated with an enabled flag.

In some embodiments, the virtual machine configuration monitoring system 230 may be configured to monitor the configuration file for updates continuously, while in other embodiments, the virtual machine configuration monitoring system may be configured to monitor for the updates periodically. Although the process 500 has been shown as monitoring for the updates after taking a snapshot, in some embodiments, the monitoring may be before taking a snapshot or in other time periods.

Upon determining that the configuration file of the virtual machine has been updated, the virtual machine configuration monitoring system 230 updates the cached location of both the configuration file(s) and the storage file(s) within the memory 245. In some embodiments, the virtual machine configuration monitoring system 230 (either directly or via the snapshot capturing system 225) may request the virtual machine configuration capturing system 260 to send an updated location of the virtual machine's configuration file(s) (including the flag(s)) and the storage file(s) (e.g., via the process 400). In other embodiments, the virtual machine configuration monitoring system 230 (either directly or via the snapshot capturing system 225) may obtain the updated location of the configuration file(s) and the storage file(s) of the virtual machine from another source. Upon receiving the updated locations of the configuration file(s) and the storage file(s), the virtual machine configuration monitoring system 230 may delete (e.g., replace) the existing locations of those configuration and storage files and store the updated locations. Thus, the virtual machine configuration monitoring system 230 monitors the configuration file(s) of the virtual machine to determine whether the cached location of the configuration file(s) is outdated, and updates the cached location of the configuration file(s) and the storage file(s), as well as the flag(s), with an updated location of the configuration file(s) and the storage file(s).

On updating the cached configuration file(s) of the virtual machine, the process 500 moves to operation 535, where the snapshot capturing system 225 determines whether it is time to capture the next snapshot of the virtual machine. The operation 535 is also reached from the operation 525 if the virtual machine configuration monitoring system 230 determines that no updates are needed to the cached copy. The process 500 remains at the operation 535 until it is time to capture the next snapshot, at which time the process 500 returns to the operation 520.

Thus, the present disclosure provides a system and method for capturing high frequency snapshots of an entity such as a virtual machine. The captured snapshots may be stored locally and/or remotely.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
caching, by a storage sub-system associated with a distributed storage system of a virtualized environment, a configuration of an entity within the storage sub-system, wherein the configuration comprises a configuration file or configuration database of the entity;
capturing, by the storage sub-system, a snapshot of the entity from the cached configuration based on a snapshot policy;
determining, by the storage sub-system, that the configuration associated with the entity has been updated;
updating, by the storage sub-system, the cached configuration based upon the updated configuration;
comparing, by the storage sub-system, a modification time of when the configuration is updated with a timestamp of when the cached configuration is created; and
determining, by the storage sub-system, that the modification time is more recent than the timestamp.

2. The method of claim 1, further comprising receiving, by the storage sub-system, the configuration of the entity from a hypervisor.

3. The method of claim 1, wherein the storage sub-system monitors a location of the configuration file or the configuration database for determining that the configuration has been updated.

4. The method of claim 1, further comprising requesting, by the storage sub-system, an updated configuration of the entity from a virtualization aware control layer upon determining that the configuration has been updated.

5. The method of claim 1, further comprising creating, by the storage sub-system, the snapshot policy based upon information provided by a user within a snapshot template.

6. The method of claim 1, further comprising:
storing, by the storage sub-system, the snapshot for a unit of time based upon the snapshot policy; and
deleting, by the storage sub-system, the snapshot upon expiration of the unit of time.

7. The method of claim 1, wherein the entity is a virtual machine.

8. The method of claim 7, wherein a virtualization aware control layer determines the configuration of the virtual machine from a hypervisor associated with the virtual machine for sending to the storage sub-system.

9. The method of claim 1, wherein the entity is a container.

10. The method of claim 9, wherein a virtualization aware control layer determines the configuration of the container from a container engine associated with the container for sending to the storage sub-system.

11. The method of claim 1, wherein the snapshot policy defines a frequency with which the snapshot of the entity is to be captured.

12. The method of claim 11, wherein the frequency is at least one snapshot within a sixty second period.

13. A system comprising:
a distributed storage system associated with a host machine, the distributed storage system comprising a storage sub-system, the storage sub-system comprising programmed instructions to capture high-frequency snapshots of a plurality of entities on the host machine, the storage sub-system comprising:
a memory that caches a configuration of the plurality of entities wherein the configuration comprises a configuration file or configuration database of the plurality of entities; and
a processing unit having programmed instructions to:
create the cached configuration of each of the plurality of entities within the memory;
capture a snapshot of each of the plurality of entities from the cached configuration based on a snapshot policy;
determine that the configuration associated with at least one of the plurality of entities has been updated;
update the cached configuration of the at least one of the plurality of entities based upon the updated configuration;
compare a modification time of when the configuration is updated with a timestamp of when the cached configuration is created; and
determine that the modification time is more recent than the timestamp.

14. The system of claim 13, further comprising a management system in operable communication with the storage sub-system, wherein the storage sub-system includes programmed instructions to receive data via the management system, and wherein the storage sub-system further includes programmed instructions to create the snapshot policy in accordance with the data.

15. The system of claim 13, wherein the plurality of entities comprise a virtual machine.

16. The system of claim 13, wherein the plurality of entities comprise a container.

17. The system of claim 13, wherein the processing unit further comprises programmed instructions to send the snapshot to a repository indicated in the snapshot policy, and wherein the repository is on a remote site.

18. The system of claim 13, further comprising a virtualization aware control layer having programmed instructions to determine the configuration of each of the plurality of entities; and wherein the processing unit includes programmed instructions to create the cached configuration from the configuration received from the virtualization aware control layer.

19. The system of claim 13, wherein the snapshot policy includes capturing more than one snapshot every sixty seconds of each of the plurality of entities in the storage sub-system.

20. A non-transitory computer readable media with computer-executable instructions embodied thereon that, when executed by a processor of a storage sub-system associated with a distributed storage system of a virtualized environment, cause the storage sub-system to perform a process comprising:
caching a configuration of an entity within the storage sub-system, wherein the configuration comprises a configuration file or configuration database of the entity;
capturing a snapshot of the entity from the cached configuration based on a snapshot policy;
determining that the configuration has been updated;
updating the cached configuration based upon the updated configuration;
comparing a modification time of when the configuration is updated with a timestamp of when the cached configuration is created; and
determining that the modification time is more recent than the timestamp.

21. The non-transitory computer readable media of claim 20, wherein the processor further includes programmed instructions to create the cached configuration from the configuration received from a virtualization aware control layer.

22. The non-transitory computer readable media of claim 20, wherein the processor further includes programmed instructions_ to receive the updated configuration from a virtualization aware control layer upon determining by the storage sub-system that the configuration has been updated.

23. The non-transitory computer readable media of claim 20, wherein the snapshot policy comprises capturing more than one snapshot every sixty seconds of the entity in the storage sub-system.

\* \* \* \* \*